United States Patent [19]

Giacobbi

[11] Patent Number: 4,666,124
[45] Date of Patent: May 19, 1987

[54] VALVE OPERATOR FOR A PLUG-TYPE VALVE

[75] Inventor: Peter D. Giacobbi, Villa Park, Calif.

[73] Assignee: Johnston Pump/General Valve, Inc., Glendora, Calif.

[21] Appl. No.: 857,070

[22] Filed: Apr. 29, 1986

[51] Int. Cl.⁴ ............................................. F16K 31/528
[52] U.S. Cl. ...................................... 251/56; 74/22 R; 74/25; 74/57; 74/89; 251/58; 251/229; 251/252
[58] Field of Search ....................... 74/22 R, 25, 57, 89; 251/56, 58, 229, 252, 162, 163

[56] References Cited

U.S. PATENT DOCUMENTS

| | | | |
|---|---|---|---|
| 1,155,576 | 10/1915 | Isley | 251/252 |
| 1,713,671 | 5/1929 | McLaren | 251/252 |
| 2,501,150 | 3/1950 | Anderson | 251/162 |
| 2,580,212 | 12/1951 | Anderson | 251/163 |
| 3,492,880 | 2/1970 | Pearson | 251/58 |
| 4,195,816 | 10/1978 | Thompson et al. | 251/229 |
| 4,293,117 | 10/1981 | Mueller | 251/229 |
| 4,350,322 | 9/1982 | Mueller | 251/229 |

*Primary Examiner*—George L. Walton

[57] ABSTRACT

An improved cam sleeve operator for use primarily with valves of the plug type in which a tapered plug is raised to unseat associated slips and then rotated to a valve open position during opening of the valve and is rotated to a valve close position and lowered to seat the associated slips for closing the valve. The operator comprises a cylindrical housing having an inverted L-shape configuration, a cam sleeve which controls the position of the valve trunnion in response to the prime mover, and a pin connecting the valve trunnion to the operator for effecting sequential vertical and rotational motion of the valve trunnion in response to unitary continuous motion of the prime mover. One particularly advantageous feature of the present invention is a uniquely shaped cam sleeve slot or helical groove of varying angle which optimizes the application of input torque for reducing prime mover peak torque requirements and for simplifying the operator structure thus reducing costs of manufacture and maintenance and significantly prolonging the operational life of the valve operator as well as reducing the overall energy consumption for each valve actuating operation.

8 Claims, 6 Drawing Figures

VALVE OPERATOR FOR A PLUG-TYPE VALVE

BACKGROUND OF THE INVENTION

1. Field of the Invention

This invention relates generally to fluid control valves and more specifically to an improved cam sleeve operator for valves of the plug type in which a tapered plug is raised to unseat associated slips and then rotated to a valve open position for opening the valve and in which the opposite actions are carried out to close the valve. The improved cam sleeve of the present invention is designed to facilitate the aforementioned vertical and rotational movements in the proper sequence while substantially simplifying the mechanical operator assembly thereby substantially reducing the overall maintenance and cost of such valves.

2. Prior Art

Plug type valves are well known in the prior art particularly in the oil and gas industries where their positive sealing and superior flow characteristics are advantageous for controlling the flow of such fluids. Plug type valves are generally the type in which a valve body is provided with a pair of coaxial ports which are connected to incoming and outgoing fluid lines for the movement of fluid under pressure therethrough. Typically, a plug is adapted to selectively rotate within the main chamber of the valve to either provide a continuous channel between the incoming and outgoing coaxial ports when the valve is in the open position or to provide a fluid tight seal in one or both of the coaxial interconnecting ports when the valve is in the closed position.

A particularly advantageous plug type valve operating mechanism is disclosed in U.S. Pat. No. 3,492,880 to Pearson which is assigned to the assignee of the present invention and is incorporated herein by reference. That patent discloses the use of a valve control and actuating mechanism that permits rotation and axial linear motion of the valve plug in separate discrete movements in order to effect inward and outward movement of the sealing mechanism to assure a good seal in a closed valve and to further assure withdrawal of the seal from the valve ports without substantially reducing the life of the seals by preventing them from forcefully rubbing along the inside surface of the valve body.

One drawback of the otherwise advantageous valve control and actuating mechanism disclosed in the aforementioned U.S. Pat. No. 3,492,880, is the relative complexity of the operator mechanism disclosed for providing the requisite sequential vertical and rotatable motion of the plug. Such complexity renders the operating mechanism, as well as the entire valve, more expensive to produce and to purchase and also more difficult and costly to maintain over its operating life. The present invention provides improvements of the aforementioned operator mechanism for vertical and rotational motion of the plug portion of the valve in a simpler and thus advantageous and novel configuration that permits achievement of all the aforementioned advantageous functional operating characteristics of the previously disclosed plug valve control and actuating mechanism while reducing the overall complexity of the valve, by decreasing the wear and tear on the valve structure and by also reducing the cost of manufacture and maintenance thereof. Relevant cam sleeve valve operators are shown in U.S. Pat. No. 4,195,816 to Thompson, et al and in U.S. Pat. Nos. 2,501,150 and 2,580,212 both to Anderson.

SUMMARY OF THE INVENTION

The present invention comprises an improved cam sleeve operator assembly which is adapted for connection at one end through a pin to the valve plug trunnion and at the other end to the valve prime mover such as a hand wheel or motor and associated gear box and in which the cam sleeve converts the motion of the hand wheel into two discrete sequential motions necessary to provide the requisite control of the valve plug motion for opening and closing the valve. A particularly novel and advantageous feature is provided in the form of at least one helical cam sleeve slot or groove which is variable in angle relative to the axis of the valve trunnion over its length in the cam sleeve wall. Variation in sleeve slot angle provides selected changes in the seating, unseating and rotational forces applied to the pin to provide an optimum relationship between operator rotation and prime mover torque.

OBJECTS OF THE INVENTION

It is therefore an object of the present invention to provide an improved cam sleeve operating mechanism for a plug type valve and that will effectively rotate the valve plug and move it axially in separate discrete movements in order to effect inward and outward movements of the sealing elements in the valve.

It is an additional object of the present invention to provide a valve operator mechanism primarily for use with a plug type valve in which the operative element is a cam sleeve adapted to interconnect the valve plug trunnion and the prime mover while substantially reducing the complexity of the valve operator configuration as compared to the prior art.

It is an additional object of the present invention to provide a valve operator mechanism for a plug type valve, the mechanism comprising a cam sleeve assembly having a pin that interconnects the trunnion and the cam sleeve and that rides in a pair of L-shaped grooves to provide the requisite direction of motion control to effect opening and closing the valve, the operator also having a pair of variable angle slots in the cam sleeve for varying the instantaneous seating, unseating and rotational forces applied to the trunnion during the opening and closing of the valve.

It is still an additional object of the present invention to provide the aforementioned cam sleeve operator for a valve of the type disclosed in U.S. Pat. No. 3,492,880 but with a substantial simplification of the valve operator mechanism, reduced prime mover torque, longer operating life, energy savings and a reduction in manufacturing and maintenance cost.

BRIEF DESCRIPTION OF THE DRAWINGS

These and other objects and advantages of the invention will be readily apparent from the consideration of the following detailed description of a preferred embodiment taken in conjunction with the accompanying drawings in which.

DETAILED DESCRIPTION OF PREFERRED EMBODIMENT

Figure 1:
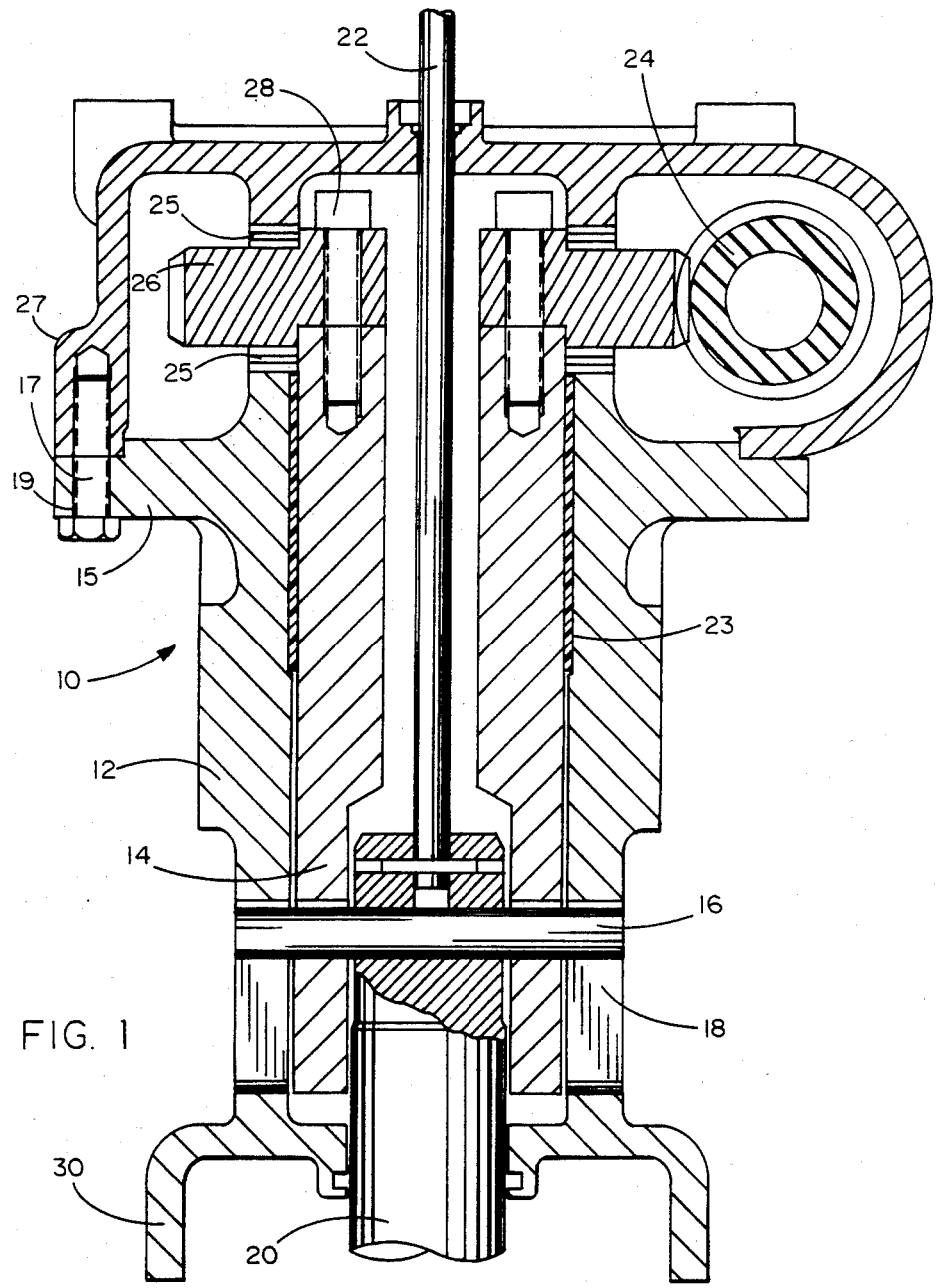
FIG. 1 is a cross-sectional view of a valve operator of the present invention.

Referring first to FIG. 1 it will be seen that the valve operator 10 of the present invention comprises a substantially cylindrical housing 12 in which is coaxially positioned a cam sleeve 14. The housing 12 provides a flange 15 to which is connected a gear cover 27 by a plurality of bolts 17. Gear cover 27 encloses a worm shaft 24 (attached to a prime mover) and a worm gear 26, the latter being affixed to the cam sleeve 14 by a plurality of bolts 28.

The interface between housing 12 and cam sleeve 14 comprises an elongated cylindrical pin 16 which, as will be seen hereinafter, passes through the cam sleeve 14 along a cam sleeve slot 36 as well as through the housing 12 at an L-shaped slot 18. In addition, the pin also passes through a valve trunnion 20 which is connected to the plug of a plug-type valve of the type hereinbefore described. The top of trunnion 20 may be optionally connected to a flag rod 22 which allows the relative position of the trunnion, and therefore of the valve plug, to be indicated externally of the valve by means of a flag (not shown) connected to the top of flag rod 22. Such a flag is indicative of the condition of the valve, that is, whether it is open or closed, by virtue of the fact that the trunnion is directly connected to the plug and therefore its position in rotation and elevation indicates the corresponding position of the plug. A sleeve bearing 23 is located between the cam sleeve 14 and the housing 12 to facilitate relative rotation therebetween.

As previously indicated, the purpose of the valve operator 10 is for use in conjunction with a plug-type valve to control the position of the plug between the open and closed position of the valve. More specifically, the valve operator 10 operates on the valve through trunnion 20 by rotating the trunnion and plug through a quarter turn and lowering the trunnion and plug to close the valve and to perform the opposite series of motions to open the valve, that is, to raise the trunnion and plug and then rotate the trunnion and plug through a quarter turn to place the plug in the valve open position. The gear 26 is supported between the top of the housing 12 and the gear cover 27 by a plurality of bearings 25. Trunnion 20 is shown in FIG. 1 projecting through an operator base 30 which is designed to mate with the valve body (not shown) with which the operator 10 is designed to operate.

Figure 2:
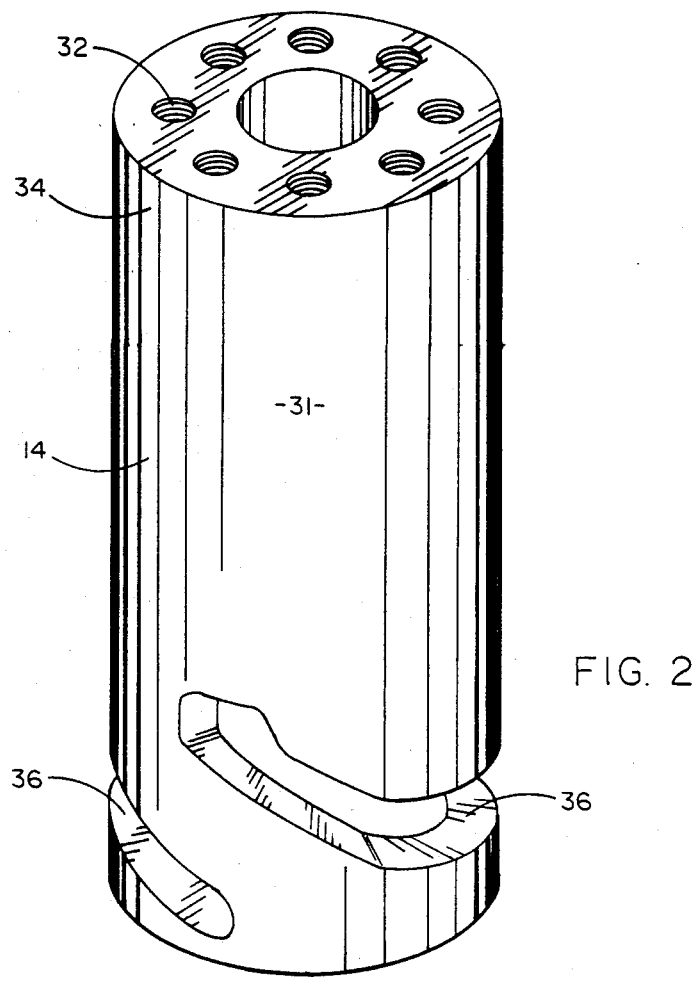
FIG. 2 is a three-dimensional view of the cam sleeve of the present invention and illustrating the structure of the invention.
Figure 3:
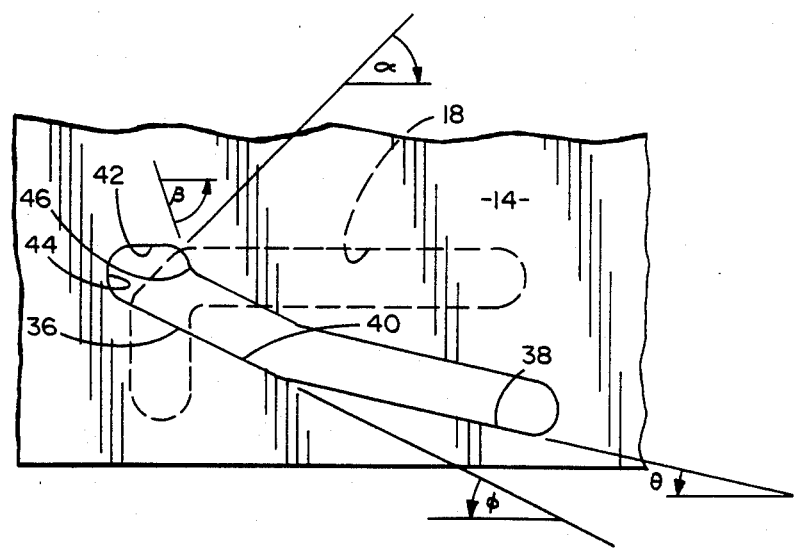
FIG. 3 is a plan view of a first embodiment of the cam sleeve slot of the invention projected onto a planar surface for purposes of description.
Figure 4:
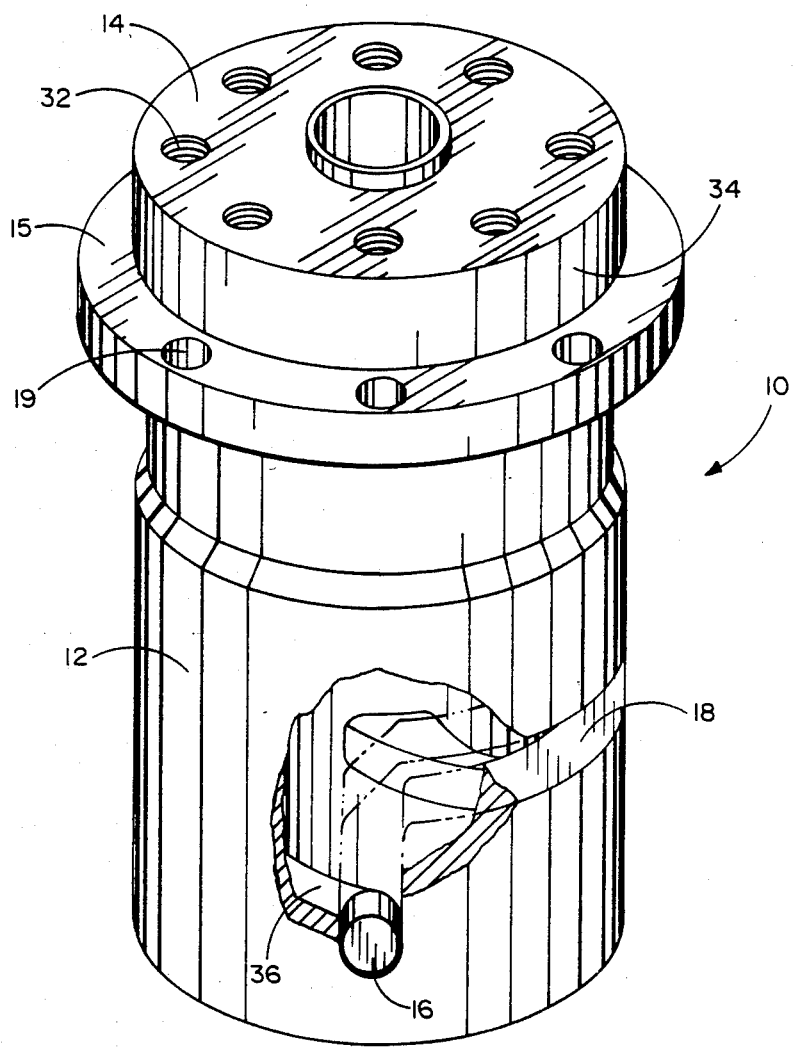
FIG. 4 is a three-dimensional partially cut-away view of a partially assembled valve operator illustrating the relationship between the cam sleeve, the housing, the pin and the valve trunnion.

Reference will now be made to FIGS. 2, 3 and 4 for a description of the detailed structure of the cam sleeve 14 and housing 12 of the present invention as well as their relative interaction during opening and closing of the valve as a result of the operation of valve operator 10 of FIG. 1. More specifically, referring first to FIG. 2 it will be seen that the cam sleeve 14 comprises a hollow cylindrical body 31 having a plurality of symmetrically spaced bolt holes 32 each adapted to receive a bolt 38 as shown in FIG. 1.

The lower portion of cylindrical body 31 is provided with a pair of cam sleeve slots 36, each of which is in the form of a helical slot in the wall of the cam sleeve 14. For purposes of explanation, one such cam sleeve slot 36 is shown in planar projection in FIG. 3 wherein it is seen that each cam sleeve slot 36 comprises three distinct portions, namely, a lower portion 38, an intermediate portion 40 and an upper portion 42.

It will be understood that the pin 16 shown in FIG. 1 extends through the cam sleeve slot 36 and into an L-shaped slot 18 which may also be seen in FIG. 4. As a result, relative rotation of the cam sleeve 14 within the housing 12 causes the pin 16 to follow the path of the L-shaped slot 18 in the housing 12. L-shaped slot 18 is shaped in the form of an L to impart the sequential lift and turn motion required to open the valve to which the present invention is designed to connect and operate. The cam sleeve slot 36 of FIG. 3 acts as a cam on pin 16 in its traverse of the L-shaped slot 18 in the housing 12 and the novel feature of the present invention resides principally in the unique shape of the cam sleeve slot 36. More specifically, lower portion 38 and intermediate portion 40 of the slot 36 are designed to cam pin 16 during its traverse of the vertical portion of L-shaped slot 18 and upper portion 42 of cam sleeve slot 36 is designed to cause pin 16 to traverse the horizontal portion of L-shaped slot 18. Furthermore, it will be seen that the lower portion 38 and intermediate portion 40 of the cam sleeve slot 36 are oriented at different angles relative to the horizontal. More specifically, lower portion 38 as seen in FIG. 3 is oriented with respect to the horizontal at an angle Θ while the intermediate portion 40 is oriented with respect to the horizontal at an angle Φ. Furthermore, it will be seen that the angle Φ significantly larger than the angle Θ. As a result, the portion of cam sleeve slot 36 which is in contact with pin 16 during the vertical traverse of the L-shaped slot 18 of housing 12 is essentially split into two components. A first component of a selected first angle is designed to increase the total angle of turn of cam sleeve 14 to lift pin 16 and therefore trunnion 20 and the associated plug of a connected plug valve whereby to decrease the peak force required to lift the valve plug through the initial part of its vertical travel where the resistance of the plug to vertical movement is at its greatest. On the other hand, the intermediate portion 40 of the cam sleeve slot 36 is at a selected second angle to continue the vertical travel of the pin 16, trunion 20 and plug to which the trunnion is connected, over a shorter angle of cam sleeve turn for the remaining portion of the vertical travel where the resistance of the plug to vertical travel is substantially decreased.

Figure 6:
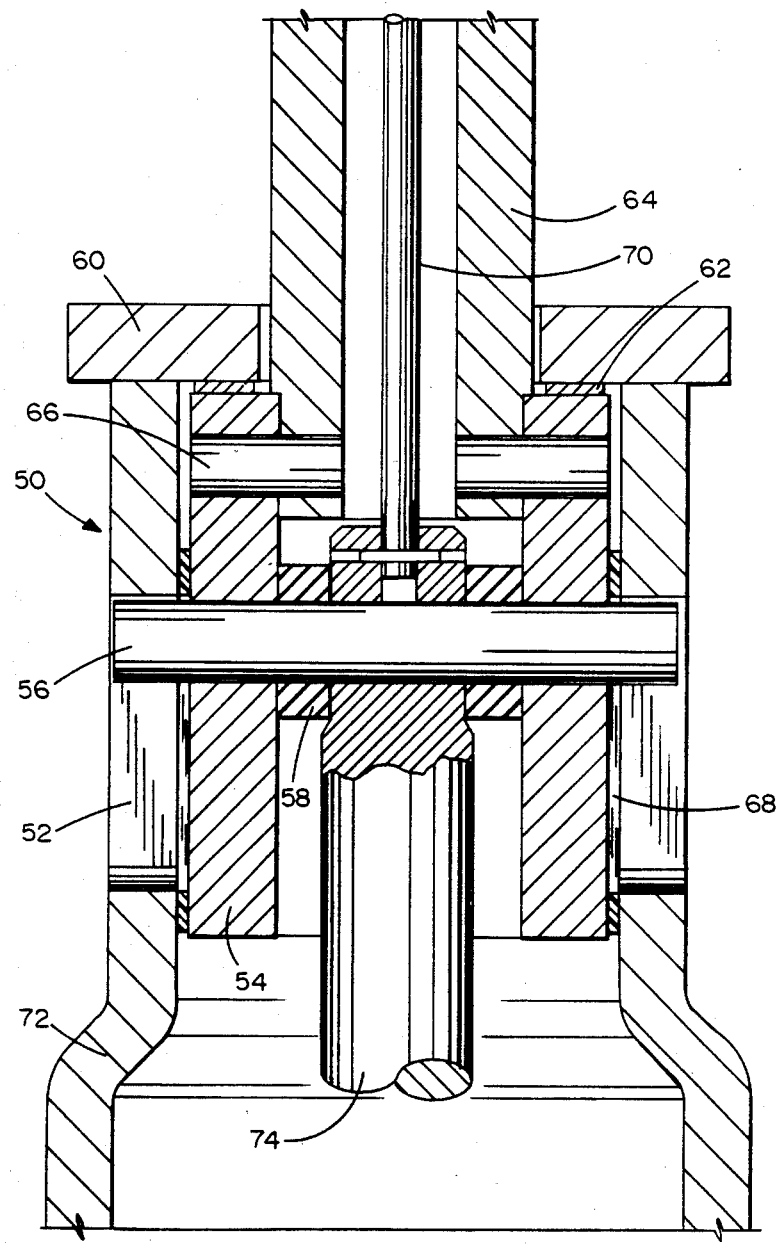
FIG. 6 is a cross-sectional view of a non-gear operated alternative embodiment of the invention.

In one embodiment of the invention the lower portion of slot 36 produces about 5.8 thousandths of an inch of vertical travel per degree of cam turn and the intermediate portion produces about 22.4 thousandths of an inch of vertical travel per degree of cam turn. The angle Θ should be equal to about 5 degrees to prevent inadvertent valve unseating in non-locking configurations such as in non-gear driven operators. For example, a manually driven operator of the present invention is shown in FIG. 6 and discussed hereinafter. The transition closing angles respectively, (i.e., α on the L-shaped slot 18 and β on the cam sleeve slot 36) are important to control within specific ranges to minimize energy and peak torque requirements at the transition from rotary to vertical motion during valve closing. In preferred embodiments of the invention the angle α is in the range of 40 to 50 degrees and the angle β is in the range of 45 to 60 degrees.

The upper portion 42 of cam sleeve slot 36 is designed to control the position of the pin 16 while the pin is in its horizontal traverse along the L-shaped slot 18 of housing 12 and it is for this purpose that the upper portion 42 is provided with a pair of oppositely facing wall surfaces 44 and 46, respectively. Vertical wall surface 44 applies a rotationally directed force to the pin 16 when the pin is being moved through the quarter turn of the valve opening process to a fully open position. The vertical configuration of surface 44 applies a purely horizontal force to pin 16 thereby eliminating friction between pin 16 and L-shaped slot 18. Wall surface 46 is used to force pin 16 through its angular travel during closure of the valve between its fully opened condition and initiation of the vertical portion of plug travel.

The partially assembled valve operator 10 of the present invention is illustrated in isometric view in FIG. 4 with a portion of the housing 12 partially broken away to illustrate the relative relationship between the L-shaped slot 18, the cam sleeve slot 36 and the pin 16. In the particular view shown in FIG. 4 the pin 16 is at its lowermost position in the vertical portion of the L-shaped slot 18 corresponding to a fully closed plug valve. It will be understood that upon rotation of the cam sleeve 14 in a counterclockwise direction as seen in FIG. 4, the interaction of cam sleeve slot 36 and L-shaped slot 18 upon pin 16 causes the pin to travel vertically upward within the vertical portion of the L-shaped slot 18. Then the aforementioned interaction causes pin 16 to move horizontally to the right as seen in FIG. 4 as the cam sleeve 14 is rotated further counterclockwise in the orientation illustrated in FIG. 4.

Figure 5:
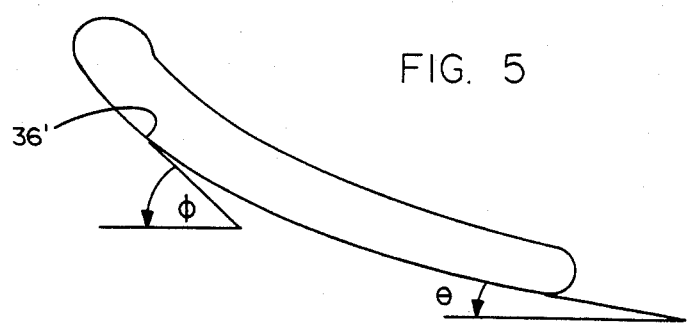
FIG. 5 is a schematic view of a second embodiment of the cam sleeve slot of the invention.

It will be understood that the particularly advantageous and novel feature of the present invention which resides in the use of a cam sleeve slot which has a plurality of selected portions of different angle relative to one another, may be provided in virtually an unlimited number of alternative embodiments in which the number of such portions is increased to provide different peak force characteristics during the valve operator operation for either closing or opening the valve to which the operator is connected. Furthermore it will be understood that an additional embodiment of the present invention may comprise a cam sleeve having a slot divided into virtually infinitesimal portions each having a different angle as the pin travels along the cam sleeve slot wherein the net result is a continuously changing angle along a cam sleeve slot the projected surface of which constitutes a smooth curve of changing angle. An illustration of such a slot profile is provided in FIG. 5.

Such a continuously changing cam slot sleeve curve provides a commensurately changing force to the pin 16 and trunnion 20 thereby permitting altering of the force applied to the valve plug for opening and closing the valve. Such modification of the force applied to the valve plug permits a reduction in the peak force or torque required of the prime mover whereby to significantly reduce the size of the prime mover. Furthermore it will be understood that a reduction in the size of the prime mover and therefore in the overall valve operator permits a substantial reduction in energy consumption, cost of manufacture, as well as other costs that are associated with the complexity, size and weight of the assembled valve configuration.

A handwheel operated embodiment 50 of the invention is illustrated in FIG. 6. This configuration is similar to the prime mover/gear operated embodiment of FIG. 1, but employs various geometrical and structural modifications to accommodate manual operation. The operator 50 comprises a housing 52, a cam sleeve 54, a cam pin 56, an adaptor 58, a cover 60, a plurality of bearings 62, a handwheel input shaft 64, a pair of cam drive pins 66 and a sleeve bearing 68. The handwheel input shaft 64 is connected to a conventional handwheel (not shown) and it provides a passage for a flag rod 70 which serves the same purpose as the rod 22 of FIG. 1. Pin 56 passes through a trunnion 74 to enable control of the valve plug by means of operator 50. The housing 52 terminates in an operator base 72 which may be bolted to the bonnet of a plug-type valve.

Cam drive pins 66 transfer rotational force from the handwheel input shaft 64 to the cam sleeve 54. The cam sleeve 54 is provided with a helical slot in which the lowermost cam angle is 5 degrees or less to prevent inadvertent unseating of the plug in view of the non-locking configuration of the operator. Housing 52 is provided with an L-shaped slot receiving pin 56. Adaptor 58 fills the gap between the trunnion 74 and cam sleeve 54.

It will now be understood that what has been disclosed herein comprises an improved cam sleeve valve operator for use primarily with valves of the plug-type in which a tapered plug is raised to unseat associated slips and then rotated to a valve open position during opening of the valve and is rotated to a valve closed position and lowered to seat the associated slips for closing the valve. The improved cam sleeve operator assembly of the present invention is a particularly novel and advantageous apparatus having at least one helical cam sleeve slot or groove which is variable in angle relative to the axis of the valve trunnion over its length in the cam sleeve wall. As a result, variation in sleeve slot angle provides selected changes in the lifting forces applied to the pin and valve trunnion to provide an optimum relationship between the operator length and prime mover torque whereby to significantly reduce the complexity and cost of the valve operator as compared to the prior art.

Those having skill in the art to which the present invention pertains will, as a result of the teaching herein disclosed, perceive various modifications and additions to the present invention. By way of example, alternative geometries for the housing and cam sleeve of the present invention as well as alternative geometries for the respective slots in each may be provided while still providing the basic advantageous feature of the invention wherein the cam sleeve slot comprises a plurality of slot surface angles in order to minimize the torque required to operate the valve during its opening and closing cycle while still limiting the rotational travel of the cam sleeve. Therefore, all such modifications and additions are deemed to be within the scope of the present invention which is to be limited only by the claims appended hereto.

I claim:

1. A valve operator primarily for use with a plug-type valve wherein a trunnion and plug are raised vertically and rotated to open the valve and rotated and lowered vertically to close the valve; the valve operator comprising:

a cam sleeve of hollow cylindrical shape and having at least one continuous helical slot in the wall thereof;

a housing of hollow cylindrical shape and having at least one L-shaped slot in the wall thereof, said housing coaxially overlying said cam sleeve in substantially contiguous relation therewith;

a pin attached to said trunnion and extending through said cam sleeve slot and into said L-shaped slot in said housing; and means for rotating said cam sleeve whereby to force said pin to traverse said L-shaped slot in said housing in one direction to open said valve and in the opposite direction to close said valve;

said helical slot having at least two distinct portions, a first such portion having a first selected angle relative to the axis of said cam sleeve and a second such portion having a second selected angle relative to the axis of said cam sleeve whereby to alter the vertical travel of said trunnion for a given angular travel of said cam sleeve during opening and closing of said valve.

2. The valve operation recited in claim 1 wherein said first selected angle is in the range of about 70 to 85 degrees and said second selected angle is in the range of about 50 to 75 degrees.

3. The valve operator recited in claim 1 wherein said first selected angle is at the lowermost portion of said helical slot; said second selected angle is at the uppermost portion of said helical slot and the angle of said slot between said first selected angle and said second selected angle increases continuously.

4. The valve operator recited in claim 3 wherein said first selected angle is about 80 degrees and said second selected angle is about 60 degrees.

5. The valve operator recited in claim 1 wherein said cam sleeve has two symmetrically spaced helical slots and said housing has two symmetrically spaced L-shaped slots.

6. A valve operator for connection to the trunnion of a plug-type valve, the valve operator comprising:
a hollow cylindrical cam sleeve the wall of which is provided with a continuous helical slot;
a hollow cylindrical housing having an L-shaped slot and coaxially overlying said cam sleeve; and
a trunnion pin for connection to a valve trunnion and extending through said helical slot and into said L-shaped slot; the angle of said helical slot having at least two different values over the length of said helical slot whereby to alter the travel of said trunnion for a given angular travel of said cam sleeve during opening and closing of said valve.

7. The valve operator recited in claim 6 wherein said L-shaped slot comprises a transition angle and said cam sleeve slot comprises a closing angle, said transition angle and said closing angle controlling said pin during closing of said plug-type valve to minimize friction during rotation of said plug and during the transition from rotation to vertical motion of said plug when said valve is being closed.

8. The valve operator recited in claim 7 wherein said transition angle is in the range of about 40 degrees to 50 degrees relative to the axis of said cam sleeve and wherein said closing angle is in the range of about 30 degrees to 45 degrees relative to the axis of said cam sleeve.

* * * * *